United States Patent [19]
Wraight

[11] Patent Number: 5,349,184
[45] Date of Patent: Sep. 20, 1994

[54] METHOD AND APPARATUS FOR REDUCING MATRIX DENSITY EFFECTS ON POROSITY MEASUREMENTS DURING EPITHERMAL NEUTRON POROSITY WELL LOGGING

[75] Inventor: Peter D. Wraight, Missouri City, Tex.

[73] Assignee: Schlumberger Technology Corporation, Houston, Tex.

[21] Appl. No.: 6,903

[22] Filed: Jan. 21, 1993

[51] Int. Cl.$^5$ .............................................. G01V 5/10
[52] U.S. Cl. .................................... 250/266; 250/262; 250/269.1
[58] Field of Search ................ 250/266, 269, 265, 262

[56] References Cited

U.S. PATENT DOCUMENTS

| | | |
|---|---|---|
| 3,487,211 | 12/1969 | Youmans . |
| 4,095,102 | 6/1978 | Tixier . |
| 4,122,339 | 10/1978 | Smith, Jr. et al. . |
| 4,122,340 | 10/1978 | Smith, Jr. et al. . |
| 4,600,838 | 7/1986 | Steinman et al. . |
| 4,691,102 | 9/1987 | Schultz et al. ...................... 250/256 |
| 4,760,252 | 7/1988 | Albats et al. .......................... 250/269 |
| 4,816,674 | 3/1989 | Ellis et al. . |
| 4,972,082 | 11/1990 | Loomis et al. . |
| 4,973,839 | 11/1990 | Nelligan . |
| 5,051,581 | 9/1991 | Hertzog et al. ...................... 250/266 |
| 5,068,531 | 11/1991 | Allen et al. .......................... 250/269 |

FOREIGN PATENT DOCUMENTS 8911108 11/1989 World Int. Prop. O. .

OTHER PUBLICATIONS

M. Gartner et al., "An Accelerator-based Epithermal Neutron Porosity Tool", SPWLA Twenty-Seventh Annual Logging Symposium, Jun. 9-13, 1986 pp. 1-17.

Primary Examiner—Constantine Hannaher
Assistant Examiner—Drew A. Dunn
Attorney, Agent, or Firm—Henry N. Garrana; Darcell Walker

[57] ABSTRACT

The porosity of the subsurface earth formation surrounding a borehole is investigated by measuring the populations of epithermal neutrons at detector locations longitudinally spaced from a neutron source. During this measuring process, a detector is located at the matrix density neutral (MDN) distance from the neutron source at which the matrix density effects of the earth formation are significantly reduced. The porosity measurements are determined from neutron counts detected at both the MDN location and other detector locations to derive formation porosity measurements which have reduced lithology and matrix density effects. Because of these reduced effects, the derived formation porosity values do not need to be substantially corrected to account for lithology and matrix density effects. In addition, the formation lithology and matrix density may be obtained from measurements taken at the MDN location and other detector locations.

50 Claims, 3 Drawing Sheets

METHOD AND APPARATUS FOR REDUCING MATRIX DENSITY EFFECTS ON POROSITY MEASUREMENTS DURING EPITHERMAL NEUTRON POROSITY WELL LOGGING

FIELD OF THE INVENTION

This invention relates generally to epithermal neutron well logging and in particular to a method and apparatus, using an accelerator neutron source, for porosity measurements of earth formations during the well logging process that reduce the matrix density effects of the subsurface earth formation.

BACKGROUND OF THE INVENTION

Knowledge of the porosities of earth formations surrounding a borehole is important in the petroleum industry to assist in identifying potential oil-and-gas-bearing locations. Epithermal neutron porosity logging which is one of the ways of investigating earth formations makes use of the facts that hydrogen strongly affects neutron moderation and that the pore spaces of earth formations are usually filled with hydrogen-rich fluids, namely hydrocarbons or water. In one form of epithermal neutron porosity logging, the borehole and formation are irradiated with neutrons from an accelerator source and populations of epithermal neutrons are detected and counted at one or more locations away from the neutron source as is shown for example in U.S. Pat. No. 5,051,581 (Hertzog et al.). The counted neutrons are correlated with porosity either individually or as ratios of counted neutrons. This form of epithermal neutron logging can be referred to as "spatial neutron porosity logging". One type of spatial neutron porosity logging measures a quantity commonly referred to as "the slowing down length" of the epithermal neutrons that irradiate the formation.

In another form of epithermal neutron logging, the borehole and formation are also irradiated with bursts of neutrons from an accelerator source and the time rate of decay (also known as die away) of epithermal neutrons is determined. In this type of measurement, epithermal neutron counts are correlated as a function of time. Such a logging technique is shown for example in U.S. Pat. No. 3,487,211 (Youmans). This form of epithermal neutron logging can be referred to as "temporal neutron porosity logging" and is also commonly known as "slowing down time" logging.

The advantage of spatial neutron porosity logging is that it provides a greater depth of investigation into the earth formation, i.e., the distance extending away from the detector and into the formation at which information is obtained, and is thus less affected by the borehole environment. Therefore, because of this greater depth of investigation, spatial neutron porosity measurements are typically less affected than temporal neutron porosity measurements by the tool standoff, i.e., distance between the detector and borehole wall, and other borehole conditions such as the type of fluids in the borehole and the invaded zone of the formation near the borehole. However, a disadvantage is that spatial measurements are normally strongly affected by earth formation lithology and matrix density.

The advantage of temporal neutron porosity logging is that those measurements are relatively insensitive to formation lithology and matrix density. However, a disadvantage with the temporal measurement is that, it is inherently a shallow measurement. Therefore, temporal measurements are strongly affected by the borehole conditions such as tool standoff, the type of fluid in the borehole and the extent of the invaded zone.

There have been several attempts to address the above stated disadvantages of both the spatial and temporal logging. In one solution, as described in the aforementioned U.S. Pat. No. 5,051,581 (Hertzog et al.), spatial and temporal measurements are combined to measure porosity. In this method, populations of epithermal neutrons are detected at near and far detector locations from a neutron source in the borehole and count signals indicative of epithermal neutron populations at the near and far locations are generated. Then a count ratio of the near detector neutron count to the far detector neutron count is generated. From neutron count ratio of these populations, the slowing down length (spatial measurement) of the neutrons is measured. The slowing down length measurement can be transformed into formation porosity measurement provided the lithology and matrix density of the formation are known. Temporal logging measurements are also obtained by determining the rate of decay and the time distribution of epithermal neutrons at one detector location. These temporal measurements are then processed to derive independent values of formation porosity. The spatial and temporal measurements are then combined to obtain a formation porosity measurement, which is substantially corrected for tool standoff.

The simultaneous measurements of both the spatial and temporal distributions of the epithermal neutrons provide porosity measurements more powerful than either measurement alone provides. As previously stated, a spatial measurement of porosity is normally very sensitive to formation lithology and matrix density and relatively insensitive to tool standoff. The slowing down time derived porosity is very sensitive to tool standoff effects and relatively insensitive to formation lithology and matrix density. As previously stated, the combination of the spatial measurement and slowing down time (temporal) measurement results in porosity values that are corrected for tool standoff. Also, the two measurements have different depths of investigation, and making both of them improves the measurement of the overall porosity variations.

Another solution is to combine the temporal measurements with other measurements as described for example in U.S. Pat. No. 5,068,531 (Allen et al). This patent discloses a method that attempts to produce a porosity measurement that is corrected for detector standoff. In the practice of the invention, the die away of nuclear radiation is measured and a model of the die away radiation is produced using exponential terms varying as the sum of the borehole formation and thermal neutron background components. Exponentially weighted moments of both die away measurements and die away models are determined and equated. The equated moments are solved for the ratio of the borehole to formation amplitude of the components. The formation die away constant is determined from at least the formation and thermal neutron background terms of the weighted measurement and model moments. The determined borehole to formation amplitude ratio is used to correct the determined formation die away constant for the effects of detector standoff from the borehole wall. A porosity log of the formation is produced which is hopefully corrected for detector standoff from the borehole wall as a function of the standoff corrected formation die away time constant calibrated in borehole models of known porosities.

Still another solution is to use signal analysis and decomposition techniques with temporal measurements as described, for example, in U.S. Pat. No. 4,600,838 (Steinman et al ) In this patent the detected indications of thermal neutron concentrations are processed by determining the zeroth order moment of the indications during the sequence of discrete time gates and determining the first order moment of the indications during the sequence of discrete time gates in order to obtain the desired neutron decay characteristic of the earth formation separate from that of the borehole.

Still other neutron logging techniques are described, for example in U.S. Pat. Nos. 4,973,839 (Nelligan) and 4,927,082 (Loomis et al.). Nelligan describes a method of determining the water saturation in the formation fluid and can identify the existence of hydrocarbons in the formation without determining the formation porosity. Loomis derives porosity from processing detector count rate measurements of the epithermal neutron die away curve in accordance with a multi-parameter fit to obtain the epithermal neutron decay time of the formation. Other more complex signal decomposition processing techniques are described for example in PCT application WO 89/11108, (Allen and Mills), published Nov. 16, 1989.

Although, these solutions may be effective, there are problems with each solution. Additional process steps are required in taking multiple porosity measurements and performing additional correction processing. Often additional information extraneous to the tool is needed to be combined with the spatial and temporal measurements and may not be available. Also, to obtain this additional information may require use of another logging tool in the formation at additional expense and time. Also, a problem with the approach using signal decomposition of the die away of neutrons is that this approach is affected by the shallow depth of investigation.

Therefore, there remains a need for a simple and accurate method and apparatus of performing epithermal neutron porosity logging that is less affected by the borehole environment and also has a reduced sensitivity to the effects of formation lithology and matrix density effects.

SUMMARY OF THE INVENTION

It is an object of this invention to measure earth formation porosity using only the spatial measurements of the epithermal neutrons.

Another object of this invention is to reduce the effects of lithology and matrix density on these spatial measurements.

Another object of this invention is to provide an improved method of determining tool standoff and the proper corrected porosity value by combining this new spatial measurement with temporal porosity measurements.

Another object of this invention is to determine the matrix density of an earth formation by combining this new spatial measurement with a more conventional spatial measurement which retains the large matrix density effects associated with "conventional" or slowing down length spatial measurements.

While it is well known that spatial neutron porosity measurements are strongly affected by formation lithology and formation matrix density, it has been discovered that the lithology and matrix density effects on these porosity measurements may be reduced by proper selection of detector spacings relative to an accelerator neutron source. Specifically, a source to detector spacing range of about eleven to thirteen inches (27.94 centimeters to 33 centimeters) has been discovered within spatial neutron logging where matrix density effects on porosity measurements are substantially reduced.

The neutron detectors measure a count or flux of epithermal neutrons returned to the borehole. However, the neutron count is affected by matrix density in two ways; (1) The attenuation of the neutron flux and (2) back scattering of the neutron flux.

At detector locations near the source, for example, shorter than ten inches (25.4 centimeters), it was discovered that matrix density negatively impacts the measured porosity. This negative impact is understood to be caused by the fact that at very short spacings less than ten inches (25.4 centimeters), a back scattering of the neutrons dominates the neutrons flux and for a given hydrogen index (ratio of the concentration of hydrogen atoms in the formation to the concentration of hydrogen atoms in water at standard conditions) of the formation, the detected neutron flux increases as the matrix density increases.

At detector locations far from the source, for example, greater than twenty inches (50.8 centimeters), it was discovered that matrix density effects positively impact the measured porosity. This positive impact is understood to be caused by the fact that at large spacings, greater than twenty inches (50.8 centimeters), the rock matrix part of the earth formation can be considered as a scattering medium which attenuates the neutron flux scattered back into the detectors. The attenuation effect dominates the neutron flux and for a given hydrogen index of the formation, the detected neutron flux decreases as the matrix density increases.

Although there is a reversal of the matrix density effects at detector locations near to and far from the source, there is a source to detector spacing range typically between eleven to thirteen inches (27.94 centimeters to 33 3centimeters), where the effects of the forward attenuation and back scattering phenomenon cancel each other and the returned neutron flux is practically independent of the matrix density and is only sensitive to the hydrogen index of the formation. This spacing will be referred to hereinafter as the "Matrix Density Neutral" distance, or the MDN distance.

This invention provides an apparatus and method that reduces the matrix density effects on porosity measurements of a subsurface earth formation using epithermal neutrons from an accelerator source. A detector is located at a MDN distance from the neutron source. The borehole and earth formation are irradiated with high energy neutrons which interact with the borehole and earth formation to produce populations of epithermal neutrons. Several neutron population counts are measured at the detector. These counts are combined with each other and used to derive a porosity measurement of the formation that has reduced sensitivity to lithology and matrix density effects.

The invention is also directed to a method and apparatus to determine the matrix density of an earth formation by comparing the porosity measurement derived from detectors at the MDN distance with the porosity measurements derived from other detectors spaced at different locations from the source. These detectors derive spatial measurements which are largely affected by formation lithology and matrix density. In one embodiment of the invention, a source monitor is longitudinally spaced a short distance from the neutron source and monitors the output of the neutron source to detect changes in output intensity. A first detector is spaced at the MDN distance from the neutron source and a second detector is spaced between the first detector and the source. The first and second detectors measure neutron populations at two locations and the ratio of the neutron populations derived from the populations counted at these detectors is used to determine a first porosity measurement of the formation. Neutron populations may also be detected at a third detector location, spaced from the neutron source at a location beyond the first detector. The ratio of the neutron populations from the detectors at the second and third locations is also used to derive a second porosity measurement of the formation. The new porosity values from the two porosity measurements taken in this method may be plotted on a graph containing known matrix density curves such that the two porosity value plots intersect at a point between the matrix density curves. From this intersection point, the matrix density of the formation can be interpolated. Further, the output of the source monitor may be employed to correct the output of the first, second and third detectors for variations in the intensity of the output of the source.

DESCRIPTION OF THE PREFERRED EMBODIMENT

Figure 1:
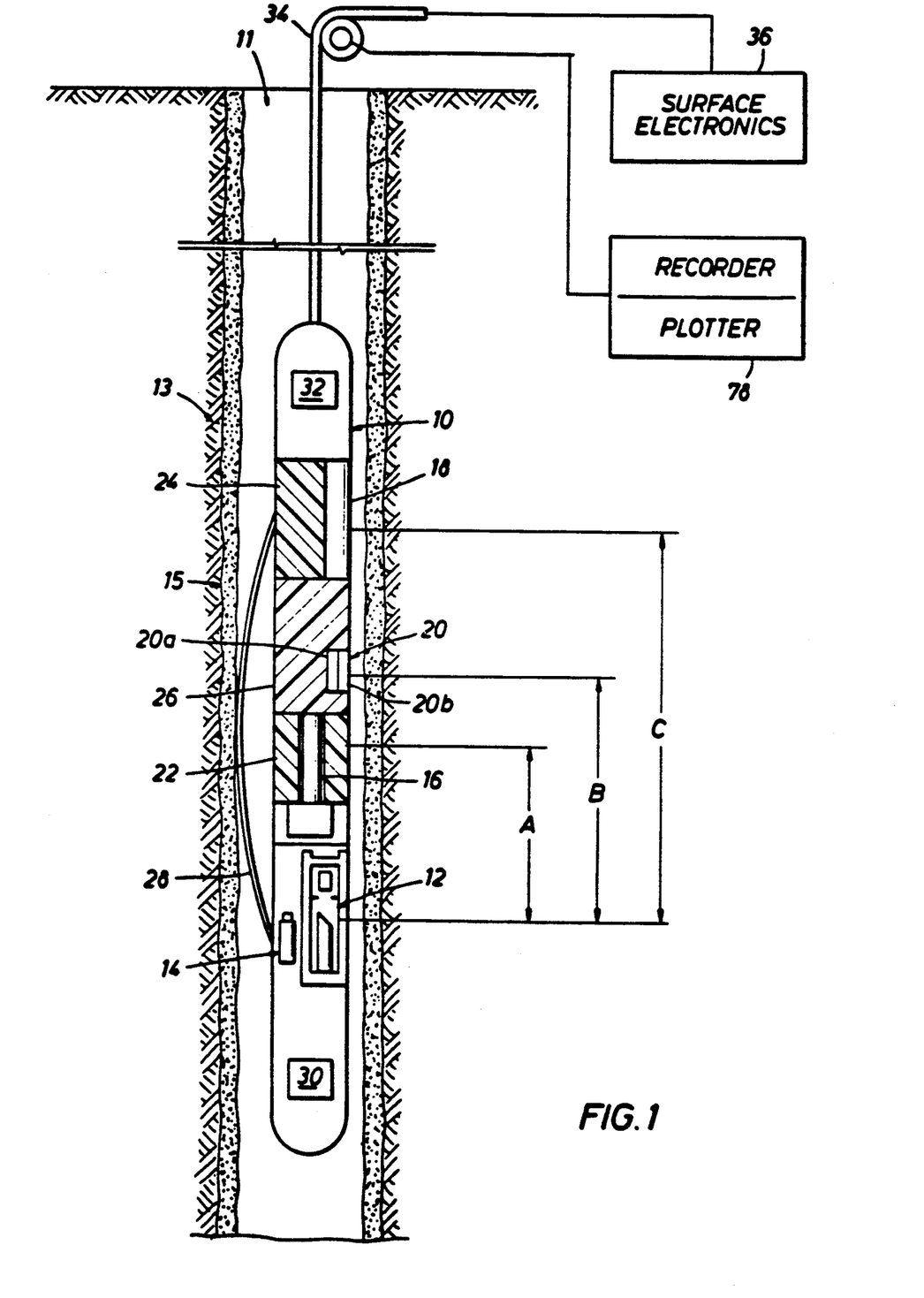
FIG. 1 is a side cross-sectional view of a well-logging tool that can be used to perform the method of the present invention.

Epithermal neutron porosity logging, according to the present invention, can be carried out using a logging tool similar in most respects to those described and shown in U.S. Pat. No. 5,051,581 (Hertzog et al, Sep. 24, 1991), which is hereby incorporated herein by reference, or any similar tool. As shown in FIG. 1, an embodiment of the tool (or sonde) is placed in a borehole 11 that transverses an earth formation 13. The borehole 11 also contains substances 15 that assist in the drilling of the borehole 11 such as drilling mud. The sonde 10 includes an accelerator neutron source 12, such as a D-T type (14 MeV) source having an output of the order of $4 \times 10$ to the eighth power n/sec or greater, a neutron source monitor 14, a near epithermal neutron detector 16, a far epithermal neutron detector 18, and a MDN epithermal detector 20. The MDN detector 20 can be an array of two (or more) epithermal neutron detectors 20a and 20b. As shown the detector 20 is spaced at the MDN distance B. It will be appreciated that, while preferred, not all of the detectors are required. For example, in cases where the neutron source has a constant output, only one detector spaced at the MDN distance is necessary. However, it is preferred that at least two differently spaced epithermal neutron detectors be provided to generate a detector count ratio. In addition, the MDN detectors can also be used to generate a slowing down time measurement. As described hereinafter, however, the combination of a near/MDN count ratio from the detectors 16 and 20 and a slowing down time measurement from one (or more) of the epithermal MDN detector(s) 20 is of particular advantage in optimizing count rate statistics and sensitivity to formation porosity.

The near detector 16 is centralized within the sonde and surrounded by an annular neutron shield 22 and is located at a distance A from the neutron source, while the far detector 18 and the MDN 20 are eccentered within the sonde and are back-shielded by neutron shields 24 and 26, respectively. The positioning of detectors 18 and 20 which are distances C and B respectively, and the shielding of the detector 18 and 20 are such as to provide high sensitivities to neutrons scattered from the formation by excluding as much as possible neutrons scattered from the borehole. The near detector 16, on the other hand, is located near the neutron source 12, is centralized within the sonde, and is shielded to desensitize it to formation neutrons and sensitize it to borehole neutrons borehole neutrons. (The structural and functional characteristics of the detectors and shielding are described in more detail in the U.S. Pat. No. 4,760,252, Albats et al. For present purposes, it is sufficient to note that the epithermal detectors 16, 18 and 20 are of the He-3 proportional counter type shielded against thermal neutrons, and the low energy detection threshold of the near detector 16 is raised by the external shield 22 to at lease approximately 10 eV.)

As shown in FIG. 1, the sonde 10 is run eccentrically in the borehole, being held in contact with the borehole wall by a bowspring 28 or other suitable means. The sonde 10 has a power supply 30 and a downhole electronics package 32 and is run in the borehole suspended by a cable 34 that includes conductors to provide electrical power to the sonde power supply 30 and to transmit a data from the downhole electronics package 32 to the surface electronics 36. Although the order of the source 12, near detector 16, MDN detector 20 and the far detector 18 is shown in FIG. 1 as from bottom to top of the sonde 10, the order may be reversed if desired.

Figure 2:
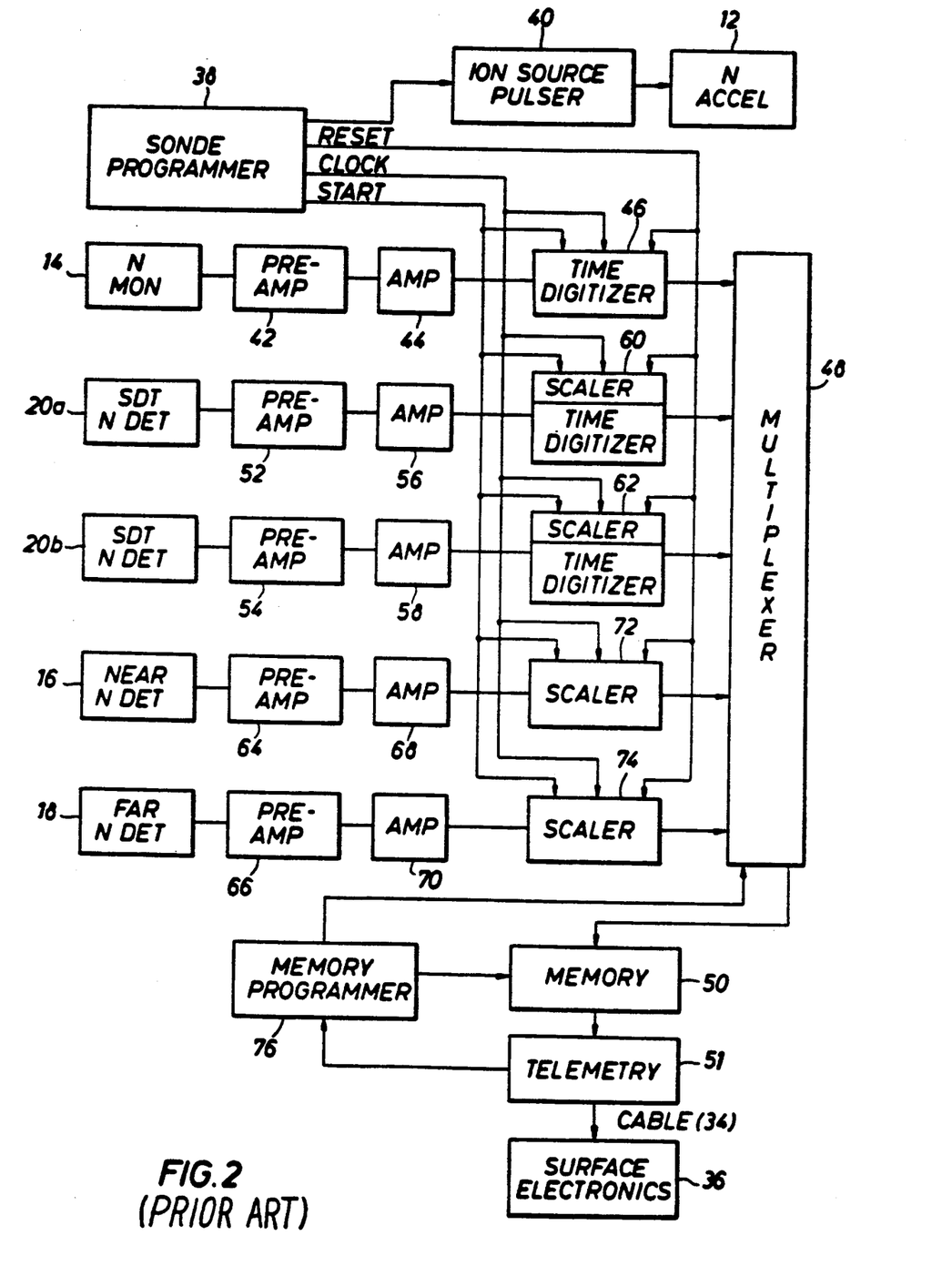
FIG. 2 is a schematic diagram of the control and signal processing circuitry of the logging tool.

Referring to FIG. 2, each neutron burst is initiated by a signal from a sonde programmer 38 to an ion source pulser 40. The burst timing regime may be selected as desired, but preferably is of the order of 10 microsecond burst width at 40 microsecond intervals. The output signals of the neutron source monitor 14, if used, are applied to a pre-amp 42, amplifier 44 and time digitizer 46 for production of a neutron burst histogram (neutron source output versus time curve) for use, if desired, in normalizing detector counts, deriving thermal neutron capture data, and defining a fiducial time window for processing the epithermal die away curve data. Further information concerning the source monitor 14 and its use are set out in the aforementioned U.S. Pat. No. 4,760,252. The time digitizer 46 is armed by a START pulse from the programmer 38, which is synchronized with the ion source pulse and occurs slightly before the neutron burst. CLOCK pulses from the programmer determine the widths of the time channels, and the input pulses from the amplifier 44 stop the CLOCK pulse counters in the digitizer 46 to digitize the time intervals from the START pulse to the input pulses. At the end of the desired data measurement interval, the digitizer 46 is reset to zero and the counts per channel data are read out by a RESET pulse from the programmer 38 to a multiplexer 48 and applied (along with detector signals) to a digital read-write memory 50.

The signals from the MDN detector 20a that measure the slowing down time are amplified (pre-amp 52 and amp 56), applied in response to CLOCK signals to time digitizer 60 and stored in the memory 50 by channels. The signals from the near, MDN and far epithermal neutron detectors 16, 20b and 18, after processing pre-amps 54, 64 and 66 and amplifiers 58, 68 and 70, are applied to scalers 62, 72 and 74 where they are accumulated for a predetermined time interval, e.g., on the order of 0.25 seconds. RESET signals apply the total counts of the near and far detectors to the memory 50. The multiplexing and memorizing of count data are controlled by a memory programmer 76, which also controls the periodic destructive readout of the data from the memory 50 through telemetry 51 to the surface electronics 36 over the sonde cable 34.

As is well known (see also the Albats et al. '252 patent referred to above), the ratio of the epithermal neutron population counted by the near detector 16 to the epithermal neutron population counted by MDN detector 20 or the far detector 18 correlates with formation porosity. For ratios with detector 18, the porosity correlation varies with formation lithology and matrix density whereas for ratios with detector 20, the porosity correlation is much less effected by lithology and matrix density. This reduced effect is attributed to the MDN distance of detector 20.

In accordance with the present invention, formation porosities substantially unaffected by the lithology and matrix density of the formation are determined from measurements of the epithermal neutron populations at at least one MDN detector 20 spaced from the neutron source 12 at the MDN distance B. Experiments have shown that the typical range of spacing between the detector 20 and the neutron source 12 is eleven to thirteen inches (27.94 centimeters to 33 centimeters).

One embodiment of this invention uses only an accelerator source and a MDN detector. For this embodiment to be reliable, the neuron source should have a constant output. In the practice of this embodiment, the earth formation is repetitively irradiated with bursts of fast neutrons from an accelerator neutron source 12. These neutrons interact with nuclei of the materials in the borehole and formation to produce populations of epithermal neutrons in the formation. The detector 20 detects these epithermal neutron populations and measures the magnitude of the neutron populations. An epithermal neutron count rate is measured at detector 20. Because of MDN spacing of detector 20, the matrix density effects cancel. Therefore, the measurements taken at detector 20 have reduced matrix density effects. The several neutron population count measurements at detector 20 are combined to determine the porosity of the formation.

Another embodiment, similar to the previous embodiment, uses an accelerator neutron source, a MDN detector and a neutron source monitor. The source monitor 14 is used to normalize the neutron detector counts. The monitor measurements are also used to derive an indication of the variations in the intensity of the output of the neutron source and to compensate the epithermal counts for any variations. By having this source monitor 14, reliable neutron counts can be obtained when the source output signal varies. Other than the addition of the source monitor, the implementation of this embodiment is the same as the above described embodiment.

A third embodiment of this invention uses a neutron source 12, a MDN detector 20 and a near detector 16. In this embodiment, a ratio of the detector counts is used to determine porosity. Because a count ratio is used instead of an actual count, a source monitor is not required to normalize detector counts in this embodiment, however, a source monitor can serve other purposes as previously described.

In accordance with this embodiment, formation porosities substantially unaffected by the lithology and matrix density of the formation are determined from measurements of the epithermal neutron populations at two detectors 16 and 20 spaced at longitudinal distances from the neutron source.

In this embodiment, the earth formation porosity is determined by repetitively irradiating the borehole and the earth formation with discrete bursts of high energy neutrons from the accelerated neutron source. Epithermal near and MDN neutron detectors 16 and 20 located in the borehole at locations A and B detect epithermal neutron populations and measure the magnitude of the neutron populations. A neutron count ratio is formed from these two measurements. Again, because of the matrix density cancellation effects, a formation porosity with reduced sensitivity to lithology and matrix density effects is determined from the neutron count ratio.

In this embodiment, the near/MDN detector ratio provides a measurement of the total number of hydrogen atoms per $cm^3$ in the formation, regardless of whether they are associated with free water, bound water, hydroxyls or oil and gas. The near/MDN output can be transformed to the "formation hydrogen index", which is defined as the ratio of the concentration of hydrogen atoms in the formation to the concentration of hydrogen atoms in water at standard conditions.

Figure 3:
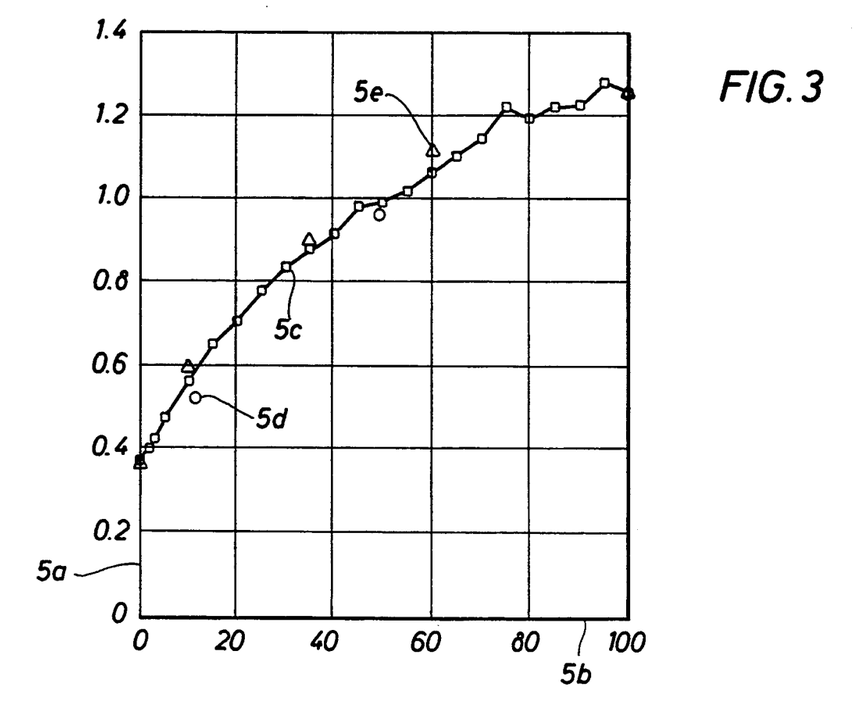
FIG. 3 is a plot of the detector ratio versus formation porosity.

FIG. 3 shows a representation of the ratio of the epithermal neutron population counts of the near and MDN detectors 16 and 20 respectively. The ratio of the counts of near and MDN detectors 16 and 20 are shown on axis 5a and the porosity values of formations with different matrix densities are shown on axis 5b. In FIG. 3, Sand 5c has a matrix density of 2.65 $g/cm^3$, Sand + Methane 5d has an effective matrix density of 2.0 $g/cm^3$ and Sandstone + Aluminum Oxide 5e has a matrix density of 3.4 $g/cm^3$. In these measurements, the MDN detector 20 was placed at the prescribed MDN spacing B from the neutron source. The near detector 16 was placed at a distance A between the neutron source and the MDN detector 20. As shown all porosity measurements fall approximately along the same porosity curve 5. As previously stated, this is due to reduced lithology and matrix density effects on the porosity measurements.

Although this new spatial technique, which yields measurements that are less sensitive to lithology and matrix density, performs very well as a stand alone measurement of porosity because of its good statistics and larger depth of investigation than that of the slowing down time temporal measurements, the ability to correct it for standoff errors by using the temporally derived porosity may still be desirable. This can be accomplished from simultaneous measurements of total epithermal neutron populations at two spaced distances A and B and of the rate of decay of epithermal neutron populations at least at one distance B. Those two measurements (spatial and temporal) investigate different aspects of the environment (borehole and formation environments) irradiated by the neutron burst. The standoff correction resulting from the combination of these measurements is considerably improved since the lithology and matrix density effects on the temporal measurement and the new spatial measurement are small and practically identical. By taking both measurements simultaneously and using both to determine formation porosity, more powerful data are available, and more accurate correlations of the measurements with true formation porosities are attainable.

During this embodiment, the die-away rate of epithermal neutrons and the counts of epithermal neutrons are both measured by detector 20. The die away rate provides another indication of subsurface formation porosity. The die-away is used as a porosity indicator and can be compared with the epithermal neutron counts to more accurately determine formation porosity.

The counts of epithermal neutrons is also measured using a second detector (near detector) 16 spaced at a distance A from the neutron source. Measurements of successive bursts of neutrons are measured at the near detector 16 are combined to provide an indication of subsurface formation porosity. In addition a near/MDN ratio of the neutrons at detector 16 and 20 can be used to determine formation porosity. These measurements can be compared to measurements of the die-away spectrum from the MDN detector 20 and neutron counts from detector the MDN detector 20 to get a more accurate measurement of formation porosity.

In addition, as in most known porosity logging techniques, this method involves correlation of data obtained from the logging run with empirically predetermined tool responses to known conditions in test pits and test wells.

As will be understood by those skilled in the art, a collection of crossplots for use in boreholes of various sites and with various lithologies and matrix densities is determined empirically and stored as programs in a surface computer to enable the correct porosity values to be plotted as a function of depth as the tool is being run. The count data are also routinely recorded for further processing if desired. A recorder 78, suitably coupled to a cable-follower mechanism, is provided for these purposes.

Although the above-described is similar to the method of Hertzog, the present invention incorporates the described MDN distance between the source and one neutron detector. As described earlier, spatial measurements taken at this MDN distance provide surprising and much improved results not contemplated or taught in the conventional spatial logging techniques.

With the present invention, there are also benefits concerning tool standoff measurements. In this method, there is a closer match between the detector ratio derived porosity and the slowing down time porosity. Because the same detector can measure slowing down time and neutron counts, the standoff measurement normally applied to the detector that measures the slowing down time is also applied to the detector that measures epithermal neutron counts (the same detector). Because of the MDN spacing, there are reduced lithology and matrix density effects on the neutron counts. Since the slowing down time measurements are inherently insensitive to lithology and matrix density both measurements are insensitive to lithology and matrix density. This insensitivity at both the slowing down time and neutron count detectors leads to a better match between the two porosity measurements and an improved correction for standoff. Because of the reduced lithology and matrix density effects, the difference between the two porosity measurements can be attributed to standoff effects. Therefore, an indication of tool standoff can be determined from any difference in the porosity measurements.

Figure 4:
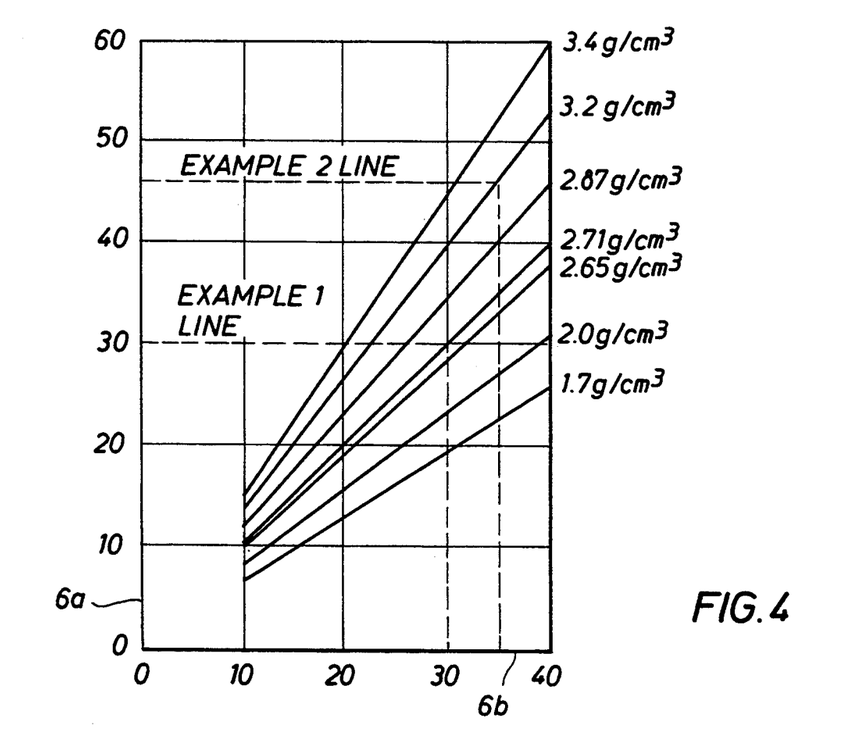
FIG. 4 is a plot of the near/medium and near/far detector count ratios versus formation matrix density.

In another embodiment of this invention, the matrix density of a formation can be estimated. This method uses three detectors as shown in FIG. 1 and determines epithermal neutron population counts at three detectors. Again, in this embodiment, the MDN detector 20 is located at a distance B from the neutron source that is the MDN distance. Near detector 16 is usually located at distance A that is approximately eight inches (20.3 centimeters) from the source 12 and the far detector 18 is usually approximately twenty-five inches (63.5 centimeters) from the neutron source. In this method, a count ratio of near detector 16 to MDN detector 20 epithermal neutron population counts is generated. This count ratio is used to determine formation porosity in the same manner as in the previous embodiment of this invention. FIG. 4 shows the formation porosity generated from this count ratio on the horizontal axis. These porosity measurements are only slightly affected by formation lithology or matrix density.

Neutron population counts from the near detector 16 and far detector 18 form a second count ratio. From this count ratio, another formation porosity is determined as is represented by the vertical axis in FIG. 4. However, this porosity is affected by the formation matrix density and formation lithology. This porosity value is projected across the plot as straight lines. The porosity value determined from the near detector 16 to the MDN detector 20 count ratio is also projected across the same plot but this projection is on an axis that is perpendicular to the axis of the porosity projection. The location where the two porosity curves intersect yields a point from which the matrix density can be interpolated.

FIG. 4 illustrates the method of determining the matrix density of a formation. In example 1, the near/MDN detector ratio formation porosity measurements shown on axis 6b and the near/far detector ratio formation porosity measurement shown on axis 6a are both 30 p.u. The formation for the measured porosity is limestone which has a known matrix density of 2.71 g/cm$^3$. In example 2, the near/MDN detector ratio formation porosity measurement is 35 p.u. The near/far detector ratio porosity measurement for the same formation is approximately 46 p.u. This difference in porosity measurements is due to the effects of the lithology and matrix density on the near/far detector porosity measurement. From these porosity measurements, straight line projections are done and the point where the projections intersect indicate the matrix density of the formation. The matrix density for this point of intersection is determined from interpolation procedures. In example 2, however, the intersection point fell on the 3.2 g/cm$^3$ matrix density line. Therefore, one can conclude that the matrix density for that formation is approximately 3.2 g/cm$^3$.

The method and apparatus of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only be the following claims.

We claim:

1. A pulsed neutron porosity logging method comprising the steps of:
   (a) repetitively irradiating a subsurface formation with bursts of neutrons from a neutron source;
   (b) measuring, by means of a first detector spaced from the source at a first given distance, a count of epithermal neutrons indicative of epithermal neutrons within the irradiated subsurface formation as a measure of matrix density neutral porosity of subsurface formation; and
   (c) combining the measurements of epithermal neutron counts from step (b) for a succession of the bursts to provide an indication of subsurface formation porosity.

2. The method of claim 1 further comprising before step (c) the step of normalizing the measurements of the epithermal neutron counts.

3. The method of claim 1 further comprising the step of:
   (d) determining the die-away rate of epithermal neutrons measured by the first detector in step (b) to provide another indication of subsurface formation porosity.

4. The method of claim 3 further comprising the step of comparing the subsurface formation porosity indicators derived from the measurements of epithermal neutron counts from steps (c) and (d) respectively.

5. The method of claim 1 further comprising the step of deriving an indication of the variations in the intensity of the output of the neutron source and compensating the measured epithermal counts for the variations.

6. The method of claim 1 further comprising the steps of:
   (d) measuring, by means of a second detector spaced from the source at a second given distance, a count of epithermal neutrons during a die-away spectrum for the epithermal neutrons within the irradiated subsurface formation;
   (e) combining the measurements of epithermal neutron counts from step (d) for a succession of the bursts to provide another indication of subsurface formation porosity; and
   (f) comparing the measurements of epithermal neutron counts from steps (c) and (e) to provide an indication of subsurface formation matrix density.

7. The method of claim 1 wherein the first given distance is approximately 30 centimeters.

8. The method of claim 6 wherein the first given distance is approximately 30 centimeters and wherein the second distance is approximately 64 centimeters.

9. The method of claim 6 further comprising the steps of:
   (g) measuring, by means of a third detector spaced from the source at a third given distance, a count of epithermal neutrons during a die-away spectrum within the irradiated subsurface formation;
   (h) combining the measurements of epithermal neutron counts from step (g) for a succession of the bursts;
   (i) deriving the ratio of combined counts from steps (h) and (e) respectively to provide an indication of subsurface porosity.

10. The method of claim 9 wherein the third detector is located between the neutron source and the first detector.

11. A method for investigating the porosity of a subsurface earth formation surrounding a borehole comprising the steps of:
    (a) positioning at least one detector at a first location in the borehole, the location being a longitudinal distance from a neutron source;
    (b) positioning at least one detector at a second location in the borehole from the neutron source such that the distance between the second detector location and the source is the matrix density neutral distance;
    (c) repetitively irradiating the borehole and earth formation with high energy neutrons from the neutron source, which neutrons interact with nuclei of the materials in the borehole and the formation to produce therein populations of epithermal neutrons;
    (d) detecting the populations of epithermal neutrons at the first and second detector locations; and
    (e) determining the porosity of the subsurface earth formation from the detected neutron populations at the detector locations.

12. The method of claim 11 wherein the distance from the second detector location to the neutron source is in the range of 28 to 33 centimeters.

13. The method of claim 11 wherein one of the detectors is an array of epithermal detectors.

14. The method of claim 11 further comprising before step (e) the step of generating neutron count signals indicative of the magnitudes of the detected epithermal neutron populations at the respective first and second detector locations.

15. The method of claim 11 wherein the porosity determination in step (e) comprises the steps of:
    generating neutron count signals, the signals being indicative of the magnitudes of detected epithermal neutron populations at the respective first and second detector locations; and
    forming a ratio of the two epithermal neutron population count signals and deriving a signal representative thereof:
    converting the ratio signal according to a predetermined relationship to derive the porosity measurement.

16. A method for investigating the porosity of a subsurface earth formation surrounding a borehole comprising the steps of:
    (a) positioning at least one detector at a first location in the borehole that is a longitudinal distance from a neutron source;
    (b) positioning at least one detector at a second location in the borehole from the neutron source such that the distance between the second detector and the source is the matrix density neutral distance;
    (c) repetitively irradiating the borehole and earth formation with discrete bursts of high energy neutrons from the neutron source, which neutrons interact with nuclei of the materials in the borehole and the formation to produce therein populations of epithermal neutrons;
    (d) detecting the populations of epithermal neutrons at the first and second detector locations in the borehole;
    (e) generating count signals indicative of the magnitudes of the detected epithermal neutron populations at the respective first and second detector locations; and (f) detecting neutron source output intensity;

(g) deriving an indication of the variations in the intensity of the output of the neutron source and compensating the measured epithermal counts for the variations;

(h) deriving from the first and second count signals a measurement signal representative of the porosity of the formation surrounding the borehole the measurement having reduced effects from the lithology and matrix density of the formation.

17. The method of claim 16 wherein the porosity measurement of step (f) is derived by forming a ratio of the two epithermal neutron population count signals and deriving a signal representative thereof; and converting the ratio signal according to a predetermined relationship to derive the porosity measurement.

18. The method of claim 16 wherein the neutron source output intensity is detected using a neutron monitor.

19. A method for investigating the porosity of a subsurface earth formation surrounding a borehole comprising:

(a) repetitively irradiating the borehole and earth formation with discrete bursts of high energy neutrons from a neutron source, which neutrons interact with nuclei of the materials in the borehole and the formation to produce therein populations of epithermal neutrons;

(b) detecting the populations of epithermal neutrons at first and second locations in the borehole spaced apart longitudinally by different distances from the neutron source, the second location being at a distance from the source that is approximately the matrix density neutral distance;

(c) generating count signals indicative of the magnitudes of the detected epithermal neutron populations at the respective first and second locations;

(d) detecting the die-away of the epithermal neutron populations following the neutron bursts at least at one location in the borehole and generating signals representative thereof:

(e) deriving from said die-away signals a signal indicative of the slowing down time of epithermal neurons in the formation at said at least one location; and (f) deriving from the first and second count signals and the slowing down time signal a measurement signal representative of the porosity of the formation surrounding the borehole inherently compensated for the effects of logging tool standoff on the responses of the logging tool.

20. A method of claim 19 wherein said porosity measurement deriving step (f) comprises combining, according to a predetermined relationship, a signal representative of a ratio of the first and second location count signals and the epithermal slowing down time signal to derive said standoff-compensated measurement signal of the formation porosity.

21. A method of claim 19 wherein said porosity measurement deriving step (f) comprises:

deriving from said first and second count signals a first measurement signal representative of formation porosity and from said epithermal slowing down time signal a second measurement signal representative of formation porosity; and combining said first and second porosity measurement signals according to a predetermined relationship to derive a correction factor signal indicative of the effect of tool standoff on said first porosity measurement signal.

22. A method of claim 21 wherein said porosity measurement deriving step further comprises combining said correction factor signal with said first porosity measurement signal to derive said standoff-compensated porosity measurement signal.

23. A method for investigating the porosity of a subsurface formation surrounding a borehole, comprising:

(a) repetitively irradiating the well borehole and surrounding earth formation with bursts of high energy neutrons from a neutron source, which neutrons interact with nuclei of the materials in the borehole and the formation to produce therein populations of epithermal neutrons;

(b) measuring the magnitude of the epithermal neutron populations at least at two locations spaced at different distances along the borehole from the neutron source and one location being at a distance from the source that is approximately the distance at which the matrix density effects of the formation are neutral and generating respective count signals representative thereof;

(c) measuring the die-away of the epithermal neutron population between bursts at least at one location along the borehole and generating signals representative thereof;

(d) deriving from said at least two epithermal neutron population count signals a first measurement of formation porosity as a function of the slowing down length of epithermal neutrons in the earth formation;

(e) deriving form said epithermal neutron population decay signals a second measurement of formation porosity as a function of the slowing down time of epithermal neutrons in the earth formation; and (f) combining said first and second porosity measurements to derive a standoff-compensated measurement of formation porosity.

24. A method of claim 23 wherein said first porosity measurement is derived by:

forming a ratio of said at least two epithermal neutron population count signals and deriving a signal representative thereof; and converting said ratio signal according to a predetermined relationship to derive said first porosity measurement.

25. A method of claim 24 wherein said second porosity measurement is derived by:

die-away signals a measurement of the epithermal neutron slowing down time of the earth formation and generating a signal representative thereof; and converting said epithermal slowing down time measurement signal according to a predetermined relationship to derive said second porosity measurement.

26. A method for determining the matrix density of a subsurface earth formation surrounding a borehole comprising the steps of:

(a) detecting the population of epithermal neutrons at first, second and third detector locations in the borehole spaced apart longitudinally by different distances from the neutron source, said second detector location being between the first and third detector locations and at a location from the neutron source such that the distance between the second detector location and the source is the matrix density neutral distance;

(b) deriving the porosity of the subsurface formation by converting the ratio of the neutron population count signals of the first and second detector locations into a porosity value according to a predetermined relationship;

(c) deriving the porosity of the subsurface formation by converting the ratio of the neutron population count signals of the first and third detector locations into a porosity value according to a predetermined relationship;

(d) plotting curves of the two porosity responses for various subsurface formations;

(e) determining on the plot of step d the point where crossplots of the formation porosities of steps b and c would intersect; and (f) interpolating the formation matrix density from the intersection point determined in step e.

27. The method of claim 26 wherein the crossplots of step (e) are determined by projecting straight lines of the two porosity values from different axes such that the lines intersect at a point that is the formation matrix density.

28. A method for investigating the hydrogen index of a subsurface earth formation surrounding a borehole comprising the steps of:

(a) positioning at least one detector at a first location in the borehole, the location being a longitudinal distance from a neutron source;

(b) positioning at least one detector at a second location in the borehole from the neutron source such that the distance between the second detector location and the source is the matrix density neutral distance of the formation;

(c) repetitively irradiating the borehole and earth formation with high energy neutrons from the neutron source, which neutrons interact with nuclei of the materials in the borehole and the formation to produce therein populations of epithermal neutrons;

(d) detecting the populations of epithermal neutrons at the first and second detector locations; and (e) determining the hydrogen index of the formation from a ratio of the neutron population detected at the first detector location to the neutron population detected at the second detector location.

29. An apparatus for epithermal neutron logging of subsurface formations surrounded by a borehole comprising:

(a) an elongated support;

(b) a pulsed source of neutrons carried on the support;

(c) a first epithermal neutron detector carried on the support at a first distance from the source, the first distance being selected to provide epithermal counts as a measure of matrix density neutral porosity of subsurface formations;

(d) a means for repetitively pulsing the source so as to generate bursts of fast neutrons from the source into the subsurface formations;

(e) a means employing the detector for measuring a count of epithermal neutrons for the epithermal neutrons within the irradiated subsurface formation between each of the bursts of neutrons; and (f) a means for combining the measurements of epithermal neutron counts from the first detector for a succession of the bursts to provide a first indication of subsurface formation porosity.

30. The apparatus of claim 29 wherein the means for measuring the count of epithermal neutrons includes means for time integrating the epithermal neutron counts.

31. The apparatus of claim 29 further comprising a means for determining the die-away rate of epithermal neutrons measured by the first detector to provide a second indication of subsurface formation porosity.

32. The apparatus of claim 31 further comprising a means for comparing the subsurface formation porosity indicators derived from the measurements of epithermal neutron counts from the first and second porosity indicators respectively.

33. The apparatus of claim 31 further comprising a means for deriving an indication of the variations in the intensity of the output of the neutron source and compensating the measured epithermal counts for the variations.

34. The apparatus of claim 29 further comprising:

(g) a second epithermal neutron detector spaced from the source of a second given distance;

(h) a means employing the second detector for measuring a count of epithermal neutrons during a die-away spectrum for the epithermal neutrons within the irradiated subsurface formation between each of the bursts of fast neutrons;

(i) a means for combining the measurements of epithermal neutron counts from for a succession of the bursts to provide another indication of subsurface formation porosity; and (j) a means for comparing the measurements of epithermal neutron counts from the first and second detectors to provide an indication of subsurface formation matrix density.

35. The apparatus of claim 29 wherein the first given distance is approximately 30 centimeters.

36. The apparatus of claim 33 wherein the first given distance is approximately 30 centimeters.

37. The apparatus of claim 34 wherein the first given distance is approximately 30 centimeters and wherein the second distance is approximately 64 centimeters.

38. The apparatus of claim 34 further comprising:

(k) third detector spaced from the source at a third given distance;

(l) a means, employing the third detector for measuring a count of epithermal neutrons within the irradiated subsurface formation between each of the bursts of fast neutrons;

(m) a means for combining the measurements of epithermal neutron counts from the third detector for a succession of the bursts; and (n) a means for deriving the ratio of combined counts from steps the second and third detectors respectively to provide an indication of subsurface porosity.

39. The apparatus of claims 29 or 34 or 38 further comprising means for deriving a record of the porosity indications as a function of the depth of the detector in the borehole.

40. An apparatus for investigating the porosity of a subsurface earth formation surrounding a borehole comprising:

(a) means for repetitively irradiating the borehole and earth formation with discrete bursts of high energy neutrons form a neutron source, which neutrons interact with nuclei of the materials in the borehole and the formation to produce therein populations of epithermal neutrons;

(b) means for detecting the populations of epithermal neutrons at first and second locations in the borehole spaced apart longitudinally by different distances from the neutron source with one detector locations being at a distance from the source at which the matrix density effects of the formation are neutral;

(c) means for generating count signals indicative of the magnitudes of the detected epithermal neutron populations at the respective first and second locations;

(d) means for detecting the die-away of the epithermal neutron populations following the neutron bursts at least at one location in the borehole and generating signals representative thereof;

(e) means for deriving from said die-away signals a signal indicative of the slowing down time of epithermal neutrons in the formation at said at least one location; and (f) means for deriving from the first and second count signals and the slowing down time signal a measurement signal representative of the porosity of the formation surrounding the borehole compensated for the effects of logging tool standoff on the responses of the logging tool.

41. The apparatus of claim 40 wherein said porosity-measurement deriving means comprises means for combining, according to a predetermined relationship, a signal representative of a ratio of the first and second location count signals and the epithermal slowing down time signal to derive said standoff-compensated measurement signal of the formation porosity.

42. The apparatus of claim 40 wherein said porosity-measurement deriving means comprises:

means for deriving from said first and second count signals a first measurement signal representative of a formation porosity and from said epithermal slowing down time signal a second measurement signal representative of formation porosity; and means for combining said first and second porosity measurement signals according to a predetermined relationship to derive a correction factor signal indicative of the effect of tool standoff on said first porosity measurement signal.

43. The apparatus of claim 40 wherein said porosity-measurement deriving means further comprises means for combining said correction factor signal with aid first porosity measurement signal to derive said standoff-compensated porosity measurement signal.

44. An apparatus for investigating the porosity of a subsurface earth formation surrounding a borehole, comprising:

(a) means for repetitively irradiating the well borehole and surrounding earth formation with bursts of high energy neutrons from a neuron source, which neutrons interact with nuclei of the materials in the borehole and formation to produce therein populations of epithermal neutrons;

(b) means for measuring the magnitude of the epithermal neutron populations at least at two locations spaced at different distances along the borehole from the neutron source one detector location being at a distance from the source at which the matrix density effects of the formation are neutral and generating respective count signals representative thereof;

(c) means for measuring the die-away of the epithermal neutron population between bursts at least a one location along the borehole and generating signals representative thereof;

(d) means for deriving from said at least two epithermal neutron population count signals a first measurement of formation porosity as a function of the slowing down length of epithermal neutrons in the earth formation;

(e) means for deriving from said epithermal neutron population die-away signals a second measurement of formation porosity as a function of the slowing down time of epithermal neutrons in the earth formation; and (f) means for combining said first and second porosity measurements to derive a standoff-compensated measurement of formation porosity.

45. The apparatus of claim 44 wherein said means for deriving said first porosity measurement comprises:

means for forming a ratio of said at least two epithermal neuron population count signals and deriving a signal representative thereof; and means for converting said ratio signal according to a predetermined relationship to derive said first porosity measurement.

46. The apparatus of claim 44 wherein said means for deriving said second porosity measurement comprises:

means for deriving from said epithermal neutron population die-away signals a measurement of the epithermal neutron slowing down time of the earth formation and generating a signal representative thereof; and means for converting said epithermal slowing down time measurement signal according to a predetermined relationship to derive said second porosity measurement.

47. An apparatus for investigating the porosity of a subsurface earth formation surrounding a borehole, comprising:

(a) a sonde adapted to be moved through the borehole; accelerator neutron source means in the sonde for repetitively irradiating the well borehole and surrounding earth formation with bursts of high energy neutrons, which neutrons interact with nuclei of the materials in the borehole and formation to produce therein populations of epithermal neutrons;

(b) a first epithermal neutron detector in the sonde spaced from but close to said neutron source, without substantial intervening high density shielding;

(c) first shielding means for shielding said first detector so as to increase the low energy neutron detection threshold thereof to at least approximately 10 eV;

(d) a second epithermal neutron detector in the sonde located farther from said neutron source than said first detector and at a distance that is the matrix density neutral distance, said second detector being eccentered towards one side of the sonde;

(e) a third epithermal neutron detector in the sonde located intermediate to said first and second detectors relative to said neutron source, said third detector being eccentered towards said one side of the sonde;

(f) third shielding means for shielding said third detector from neutrons incident thereon from all sides thereof except said one side of the sonde;

(g) means for eccentering the sonde in the borehole so that said one side of the sonde is closely adjacent to the borehole wall;

(h) means for separately counting the neutrons detected by said first and second detectors over a time interval encompassing a plurality of said neutron bursts and for generating first and second count signals representative thereof;

(i) means for deriving from said first and second count signals a first measurement correlatable with the porosity of said earth formation;

(j) means for counting the neutrons detected by said third detector during a plurality of time intervals and generating a corresponding plurality of count signals representative thereof;

(k) means for deriving from said plurality of count signals a measurement of the epithermal neutron slowing down time of the earth formation as a second measurement correlatable with the porosity of said formation; and (l) means for combining said first and second porosity-correlatable measurements to provide an improved measurement of formation porosity.

48. The apparatus of claim 47 wherein said first measurement comprises a ratio of said first and second count signals.

49. The apparatus of claim 47 wherein:

said means for deriving said first porosity-correlatable measurement comprises means for deriving a first quantitative measurement of formation porosity; and said means for deriving said second porosity-correlatable measurement comprises means for deriving a second quantitative measurement of formation porosity.

50. The apparatus of claim 49 wherein said combining said first and second quantitative measurements to derive an improved formation porosity measurement.

* * * * *